United States Patent
Jitaru

(10) Patent No.: US 7,558,082 B2
(45) Date of Patent: Jul. 7, 2009

(54) METHOD AND APPARATUS FOR CONTROLLING A SYNCHRONOUS RECTIFIER

(75) Inventor: Ionel D. Jitaru, Tucson, AZ (US)

(73) Assignee: DET International Holding Limited, Grand Cayman (KY)

( * ) Notice: Subject to any disclaimer, the term of this patent is extended or adjusted under 35 U.S.C. 154(b) by 176 days.

(21) Appl. No.: 10/509,983

(22) PCT Filed: Mar. 28, 2003

(86) PCT No.: PCT/CH03/00203

§ 371 (c)(1),
(2), (4) Date: Apr. 21, 2005

(87) PCT Pub. No.: WO03/084037

PCT Pub. Date: Oct. 9, 2003

(65) Prior Publication Data

US 2005/0254266 A1      Nov. 17, 2005

Related U.S. Application Data

(60) Provisional application No. 60/368,508, filed on Mar. 29, 2002.

(51) Int. Cl.
*H02M 3/335* (2006.01)
(52) U.S. Cl. ............... 363/21.06; 363/21.08; 363/21.14
(58) Field of Classification Search ............. 363/21.06, 363/21.08, 21.14, 21.16, 98, 131, 17, 89
See application file for complete search history.

(56) References Cited

U.S. PATENT DOCUMENTS

| | | | |
|---|---|---|---|
| 5,179,512 A | 1/1993 | Fisher et al. | |
| 5,757,627 A * | 5/1998 | Faulk | 363/21.14 |
| 5,991,171 A | 11/1999 | Cheng | |
| 6,594,161 B2 * | 7/2003 | Jansen et al. | 363/21.14 |

FOREIGN PATENT DOCUMENTS

| EP | 1 150 417 | 10/2001 |
|---|---|---|
| WO | PCT/US00/27897 | 4/2001 |

* cited by examiner

*Primary Examiner*—Shawn Riley
(74) *Attorney, Agent, or Firm*—Gallagher & Kennedy, P.A.; Thomas D. MacBlain

(57) ABSTRACT

The present invention is directed to a switch mode power converter for supplying an output power to a load, which includes a switching device having a switching input, a switching output, and a control input for enabling or disabling the switching device from conducting current from the switching input to the switching output. The converter also includes a network in which the switching device input, the switching device output, and the load are connected together to form a circuit. The converter also includes a bias winding in the circuit for producing a bias voltage representative of the output power, and a control circuit. The control circuit is for (a) determining the rate of change of the bias voltage, (b) characterizing the rate of change, and (c) controlling the control input as a result of the characterization (b).

38 Claims, 14 Drawing Sheets

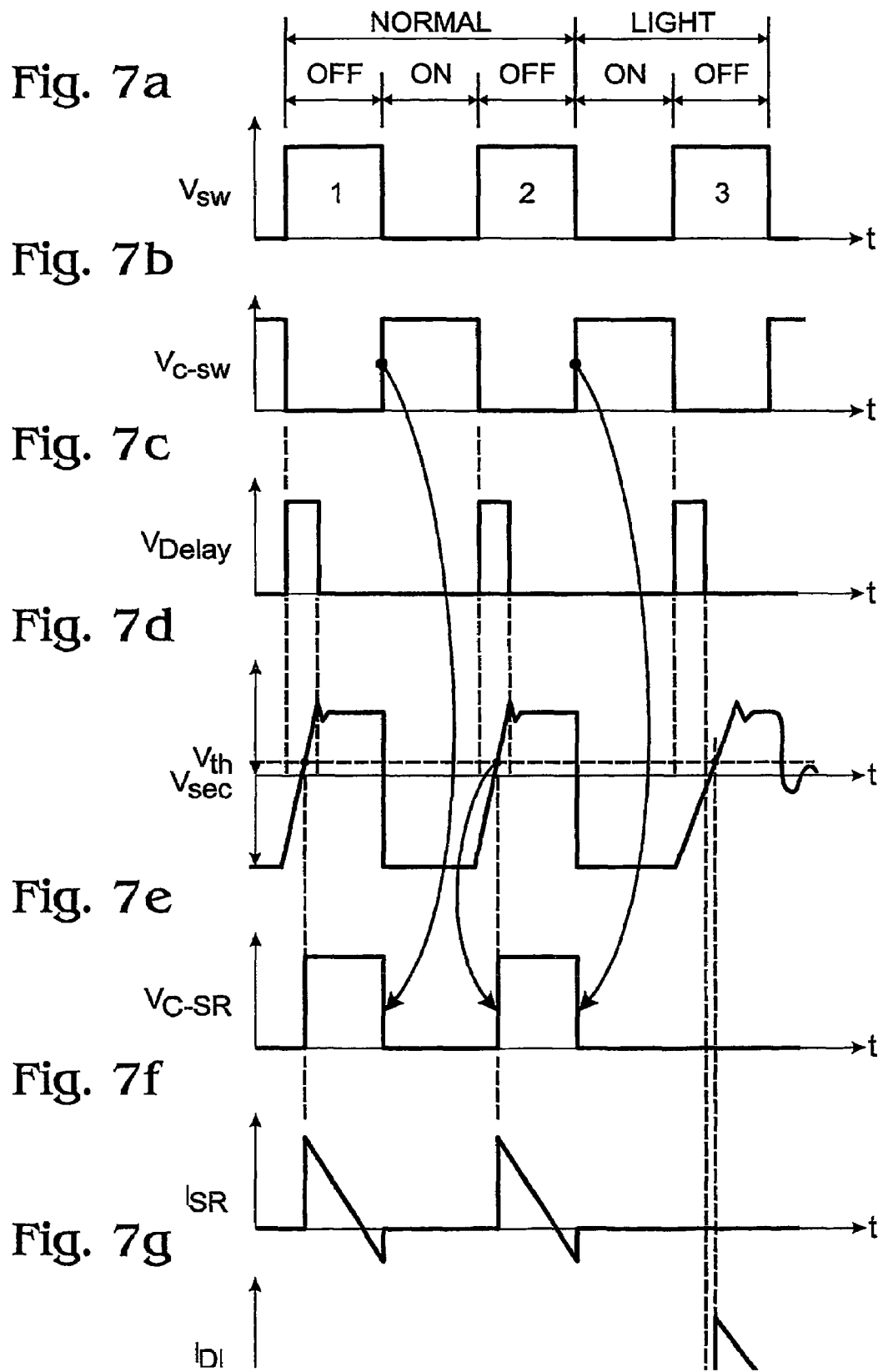

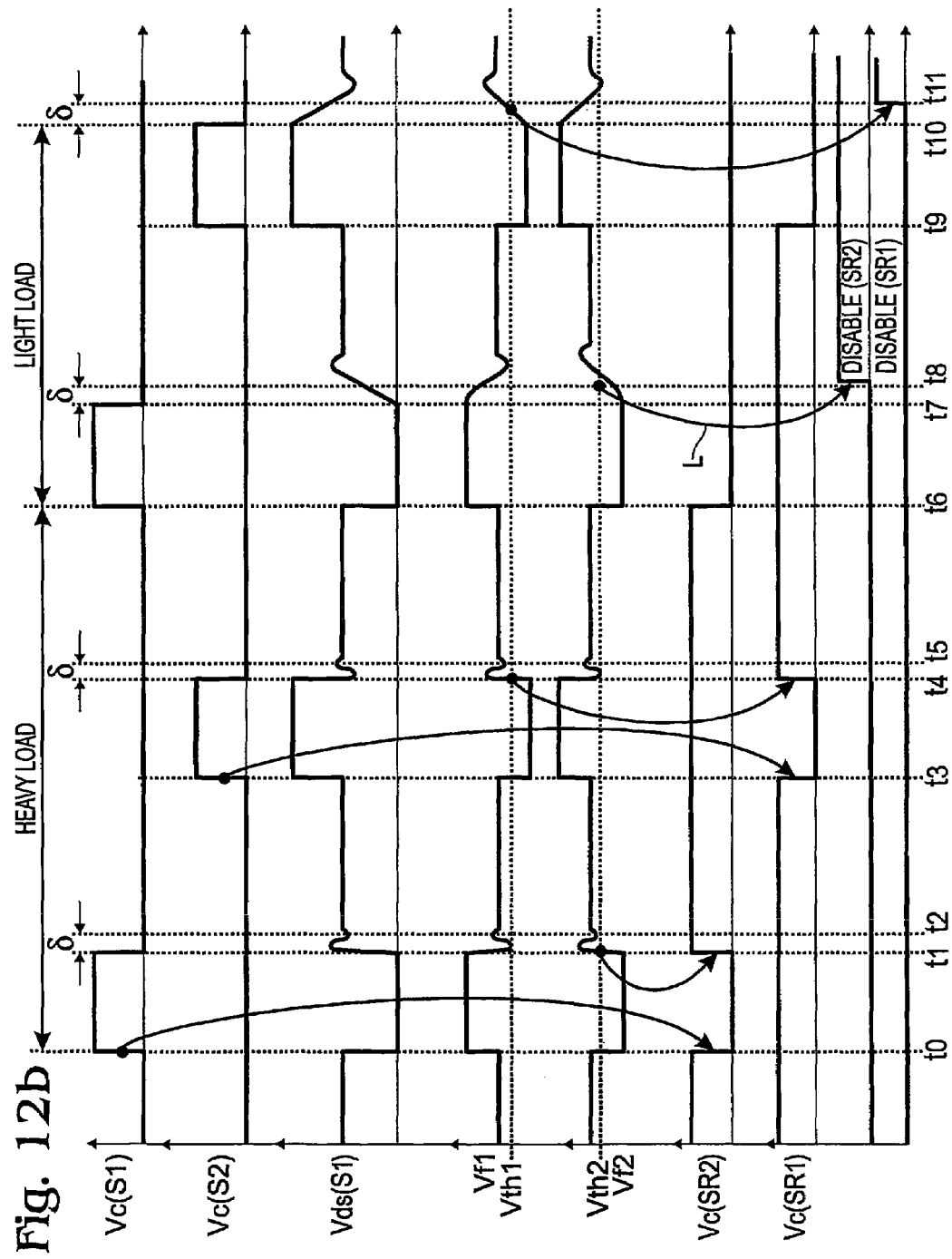

METHOD AND APPARATUS FOR CONTROLLING A SYNCHRONOUS RECTIFIER

This application claims the benefit of the provisional application Ser. No. 60/368,508 filed on 29 Mar. 2002 and entitled Driving Synchronous Rectifiers, which is incorporated by reference in its entirety. This application is the U.S. national stage of international application PCT/CH03/00203, filed Mar. 28, 2003.

BACKGROUND

The present invention is directed generally to the field of power electronics, and specifically to a method and apparatus for controlling a synchronous rectifier.

BACKGROUND

In order for any electric circuit or device (a "load") that runs on electricity to operate properly, electric power must be supplied to it; and this power must be supplied al levels of current and voltage, and within tolerances, that are specified for a particular load. A switched-mode power converter is a device that receives electric energy from a raw input source generally not suited for a load and supplies a regulated output of electric energy in a form and an amount that is suitable for a particular load.

A switched-mode power convener includes at least one primary switch that is used to switch a direct current input on and off to produce a time-varying voltage and current. The direct current input may be supplied by a battery or be derived by rectifying an alternating current. A switched-mode converter includes a magnetic storage element, which may be an inductor, and frequently is a transformer for electrically isolating input from output. The time-varying voltage and current is coupled to the magnetic storage element. When the DC input is switched on, a magnetic field is induced in the magnetic storage element, and when the DC input is switched off, the magnetic field collapses, transferring the stored energy into an electrical current.

A switched-mode power converter also includes a circuit for controlling the primary switch or switches used to switch the input current on and off. The time period when the switch is closed is referred to as $T_{ON}$ or simply the "on" period and the time period when the switch is off is referred to as $T_{OFF}$ or simply the "off" period. A switching time period $T_S$ or "duty cycle" is defined as $T_S=T_{ON}+T_{OFF}$. The control circuit can regulate the amount of power that is delivered to the load by making the on period longer or shorter for a fixed duty cycle. Alternatively, the amount of power delivered can be regulated by making the duty cycle longer or shorter for a fixed on period. Because the output voltage of a switched-mode converter generally depends on the input voltage, the duty cycle, and the load current, a feedback signal indicative of the output voltage or current is provided to the control circuit for use in regulating the duty cycle.

In addition to the primary switch, a switched-mode power converter commonly includes one or more switches that control the flow of current and prevent it from flowing in certain directions within the converter circuit. These devices for controlling the flow of current in a switched-mode power converter are referred to herein as "secondary switches."

Switch mode power converters in a variety of topologies are known. Some of the primary topologies that use an inductor as the magnetic storage element are the buck, boost, and buck-boost topologies. The buck topology is shown in FIG. 1, the boost topology is shown in FIG. 2, and the buck-boost topology is shown in FIG. 3. Other important topologies that use an inductor as the magnetic storage element are the full-bridge, half-bridge, and Cuk topology. In FIGS. 1-3, the reference numbers 20 and 22 identify, respectively, the primary and secondary switches. In other topologies, the primary and secondary switches are located similarly to the locations shown in FIGS. 1-3. In general, some of the principal switch mode power converter topologies that incorporate a transformer as a magnetic storage element to achieve electrical isolation include the flyback converter which is derived from the buck-boost converter, the forward converter which is derived from the buck converter, the forward-flyback converter, the push-pull converter which is derived from the buck converter, and the half-bridge and full-bridge converters which are derived from the buck converter. The forward converter, a modified version of the forward converter known as the two-transistor forward converter, the forward-flyback converter, and the half-bridge and the full-bridge converters have, in addition to a transformer, one or more inductors on the output or secondary side of the transformer dial serve as additional magnetic storage elements.

In some topologies, energy is transferred to the magnetic storage element (or elements) and to the load during the $T_{ON}$ portion of the duty cycle. This may be referred to as a forward transfer. The transfer of energy from the magnetic storage element to the load that occurs during the $T_{OFF}$ portion of the duty cycle may be referred to as the flyback transfer. If the topology has two secondary switches and both switches conduct current during the flyback transfer, the topology is referred to as a symmetrical topology. On the other hand, if the topology has two secondary switches and one switch conducts only during the forward transfer and other conducts only during the flyback transfer, the topology is referred to as an asymmetrical topology. In addition, if the topology has only one secondary switch and the switch conducts during the forward and flyback transfer, the topology is considered an asymmetrical topology. Symmetrical topologies include the full-bridge, half-bridge, and push-pull. Asymmetrical topologies include the forward converter, the two-transistor forward converter, and the forward flyback converter with an active clamp. In addition, to the symmetrical and asymmetrical topologies, there is a third type of topology in which there is only one secondary switch and it conducts only during the flyback transfer. The flyback converter is an example of this third type of topology.

Diodes have traditionally been be used as a secondary switch within switched-mode power converters. A diode has input and output terminals and may be either forward- or reverse-biased. An "ideal" diode will conduct a current when the input terminal is at a higher voltage than the output by a "cut-in voltage," that is, when it is forward-biased, and will not conduct when the voltage difference is below the cut-in voltage, that is, when it is reverse-biased. Thus, the diode acts as closed switch when it is forward-biased and as an open switch when it is reverse-biased.

An advantage of using a diode switch in a switched-mode power converter is its simplicity. However, diodes have a fixed forward voltage drop that is independent of the amount of current flowing in the diode. Typically, the voltage drop across a diode is on the order of 0.5 to 1 volt, or more. The electric power consumed by any device is the product of the voltage drop across it times the current through it. Because of the fixed forward voltage drop, high levels of power can be dissipated in the form of heat in a switched-mode power converter that uses ordinary diodes. Moreover, power losses increase significantly with the amount of current that flows in the diode. A special type of diode known as a Schottky diode has a smaller forward voltage drop than an ordinary diode, typically on the order of 0.15 to 0.45 volts. To achieve greater efficiency, Schottky diodes are commonly used as switches in switched-mode power converters.

Beginning with the invention of the transistor and later the integrated circuit, there has been and continues to be a trend to circuits with smaller and smaller features. In addition, there has been and continues to be a trend to circuits with higher and higher switching speeds. These trends are widely recognized. Within the field of power engineering, several related trends are recognized which concern the requirements of switched-mode power converters that supply power to these smaller and faster circuits. Specifically, switched-mode power converters must be made to fit within dimensions that are increasingly smaller, they must be able to supply voltages that are increasingly lower, and supply currents that are increasingly higher. For example, the typical required supply voltage has dropped from 5 volts to 3.3 volts, with devices in the near future expected to require only 1.5 volts. In addition, gigahertz switching speeds are now common and the current required in a circuit generally increases with frequency. Moreover, because many circuits today are battery powered so that devices incorporating them can be used with mobility, there is a need for switched-mode power converters that are ever more efficient. Yet another requirement of present electronic circuits stems from the power-saving "sleep mode" that many such circuits enter during periods of inactivity. A switched-mode power converter must be able to supply levels of energy for both normal and sleep modes. While Schottky diodes are more efficient as secondary switches than ordinary diodes, further improvements in efficiency and miniaturization would be desirable.

A synchronous rectifier is a type of switch that is significantly more efficient than a diode. In addition, a synchronous rectifier permits the use of smaller magnetic and electric storage elements. A synchronous rectifier is typically a MOSFET (metal-oxide-semiconductor field-effect transistor) and bypass diode embedded within the same silicon structure. In comparison to the 0.15 to 0.45 voltage drop of a Schottky diode, the voltage drop across a MOSFET during conduction is typically less than 0.1 volt. A MOSFET is a three terminal device in which a current will flow between a source terminal and a drain terminal if a control signal is applied to a gate terminal, provided of course that the source and drain are at different voltages. (The MOSFET is operated in cut-off and saturation modes, and accordingly when the control signal is applied it must be sufficient to place the MOSFET in saturation.) The MOSFET stops conducting and acts like an open circuit when the control signal is removed from the gate. Thus, the MOSFET acts as closed switch when there is no control signal on the gate and as an open switch when a control signal is applied.

MOSFET devices have properties that can create problems in certain switched-mode power converters or under certain conditions. Unlike a diode, a MOSFET is capable of conducting current in either direction, that is, from drain to source or from source to drain. If the load transitions from a slate where it needs a lot of power to one where it needs much less power, it is possible that current can flow within the converter circuit in reverse of the intended direction. Reverse current flow can mean that energy is transferred from the load to the input source, reducing converter efficiency. Thus, synchronous rectifiers have generally only been used if the direction of current flow can be guaranteed. Another potential problem arises from the fact that the primary switch in a switched-mode converter is commonly a power MOSFET. If the primary switch is turned on before the secondary switch has turned off, both MOSFETs will simultaneously conduct current, resulting in an undesirable "shoot-through" current. A shoot-through current generates large power losses and leads to rapid failure of the switching devices. For this reason, the control synchronous rectifiers must also be precisely regulated.

As mentioned, the use of a diode as a secondary switch in a switched-mode power converter has the advantage of simplicity: a diode does not require a control signal. When a synchronous rectifier replaces a diode, some method for providing a control signal is required. One method for providing a control signal is the "self-driven" method. In the self-driven method, the gate of the synchronous rectifier is directly coupled to a secondary winding of a transformer. However, in some circuit topologies, it may not be possible to implement the self-driven method. In addition, the self-driven method may not provide the required degree of precision. Self-driven topologies are typically not suited for applications where the input power or required load power fluctuates. Further, self-driven topologies are typically not suited for situations where two or more converters are coupled in parallel to supply a single load. In another method, the output voltage may be used as a feedback signal for a secondary switch control circuit. The use of output voltage suffers from the problem that it typically changes too slowly to provide rapid feedback concerning changes in the power requirements of the load. This slow response to fast current transients fails to protect switches and leads to devices failure. In yet another method, the output current may be used as a feedback signal for a secondary switch control circuit. While output current changes faster than output voltage, providing faster feedback than the voltage method, the use of the output current requires a current sensor. Thus, a disadvantage of use output current as a feedback signal is that an additional component is needed, a component which reduces efficiency by adding output impedance.

Accordingly, there is a need for a method and apparatus for providing a control signal for controlling a synchronous rectifier that does not suffer from the disadvantages of the known methods for providing a control signal.

SUMMARY

The present invention is directed to a switch mode power converter for supplying an output power to a load. The switch mode power converter includes, in a preferred embodiment, a switching device having a switching input, a switching output, and a control input for enabling or disabling the switching device from conducting current from the switching input to the switching output. The converter preferably also includes a network in which the switching device input, the switching device output, and the load are connected together to form a circuit. The converter preferably also includes a bias winding in the circuit for producing a bias voltage representative of the output power, and a control circuit. The control circuit is for (a) determining the rate of change of the bias voltage, (b) characterizing the rate of change, and (c) controlling the control input as a result of the characterization (b).

DRAWINGS

Figure 4A:
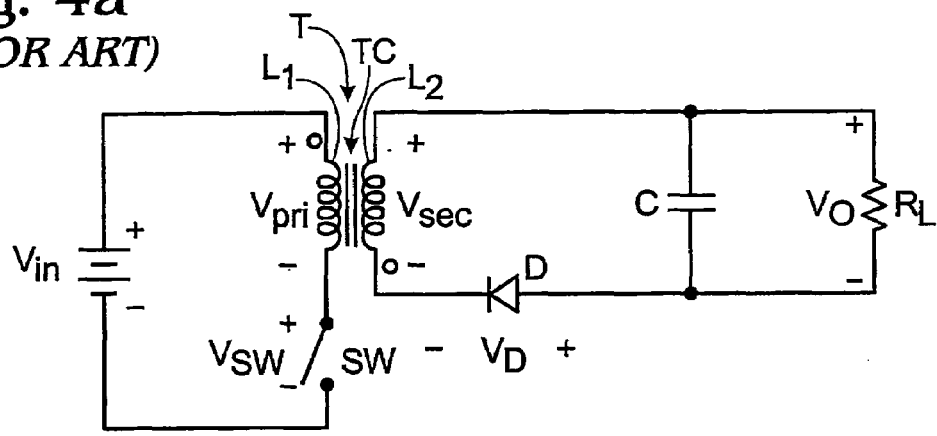
Figure 4B:
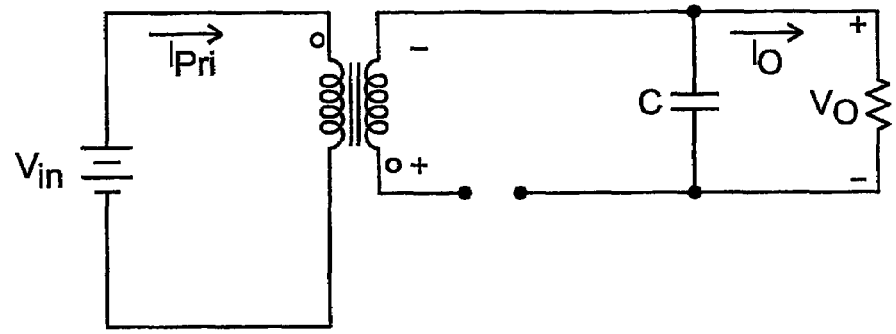
Figure 4C:
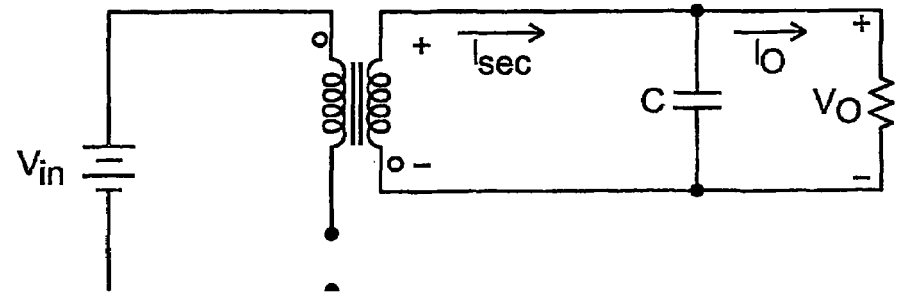

FIGS. 4a-c illustrate a known switch mode power converter in a flyback topology.

FIGS. 5a-f illustrate waveforms of voltages and currents in the converter of FIG. 4 at different points in time.

Figure 6A:
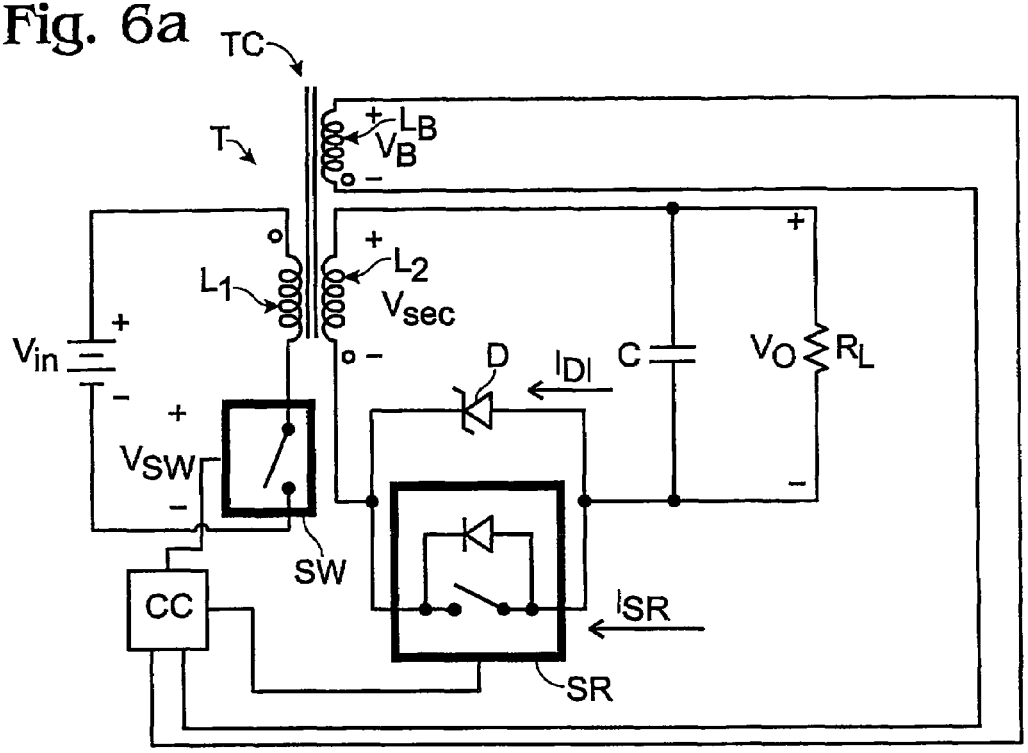
Figure 6B:
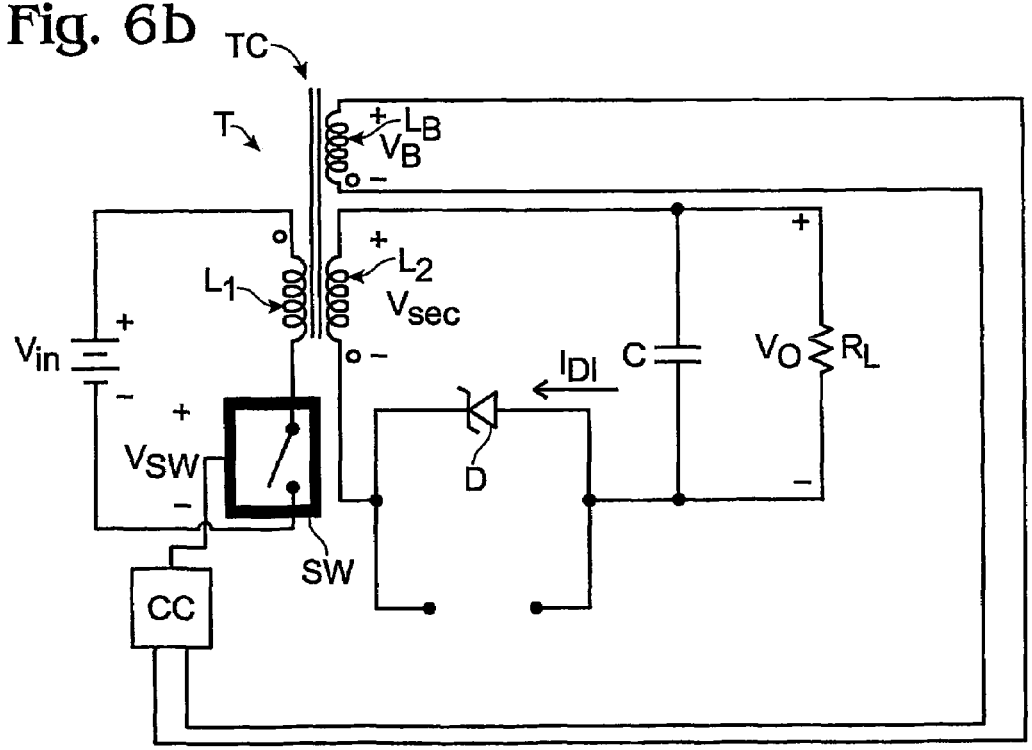

FIGS. 6a-b illustrate a switch mode power converter in a flyback topology according to one embodiment of the present invention.

FIGS. 7a-g illustrate waveforms of voltages and currents in the converter of FIGS. 6a-b at different points in time.

Figure 8:
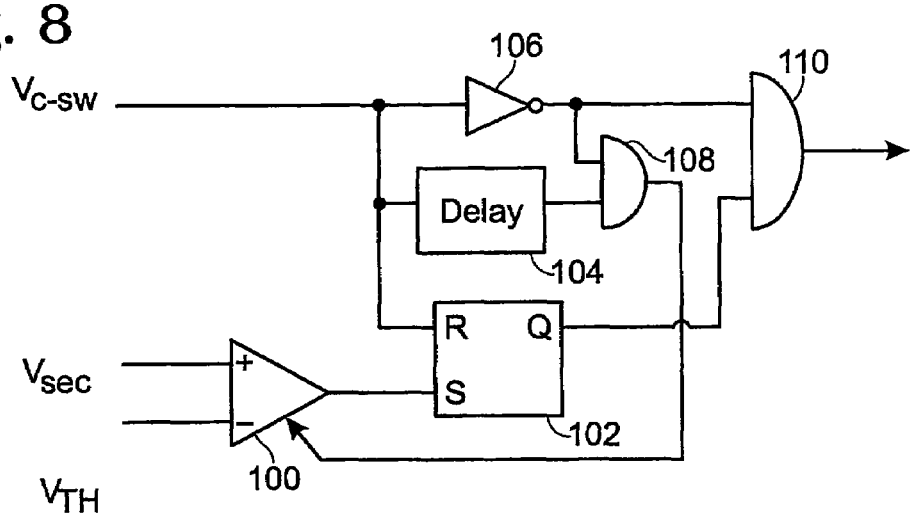

FIG. 8 illustrates one embodiment of a control circuit of the present invention.

Figure 9A:
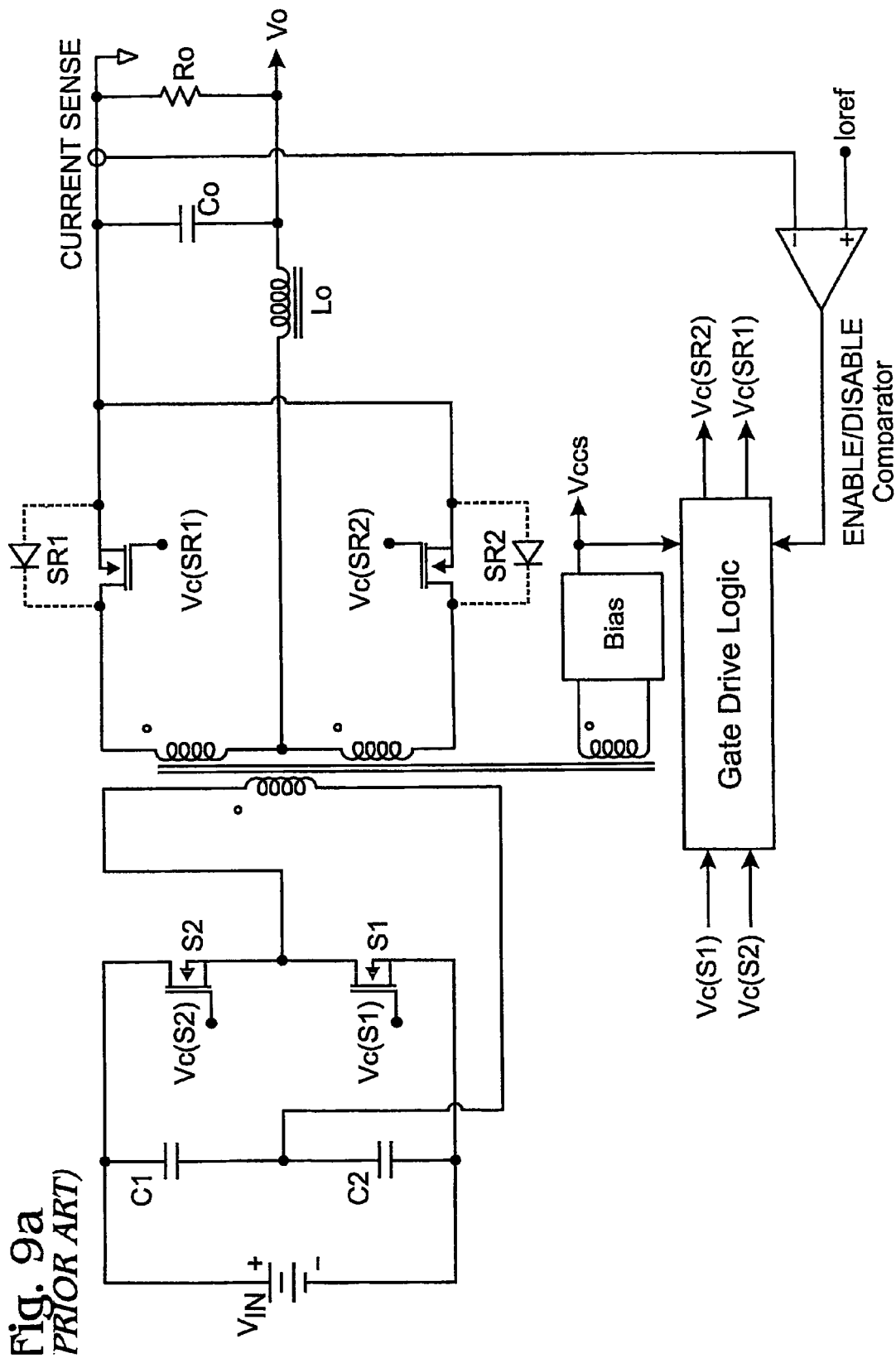

FIG. 9a illustrates a known switch mode power converter in a half-bridge topology.

Figure 9B:
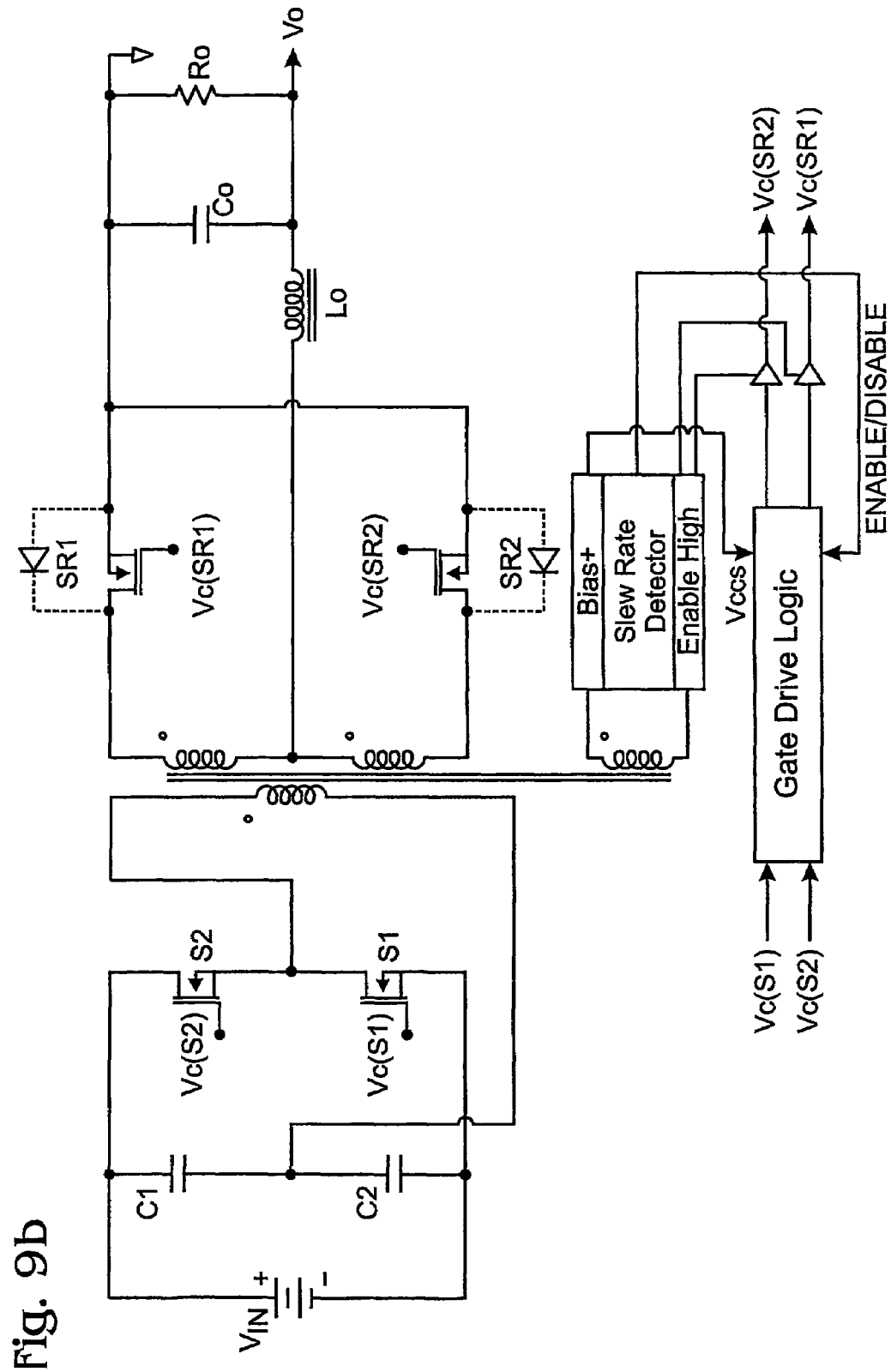

FIG. 9b illustrates a switch mode power converter in a half-bridge topology according to one alternative embodiment of the present invention.

Figure 10A:
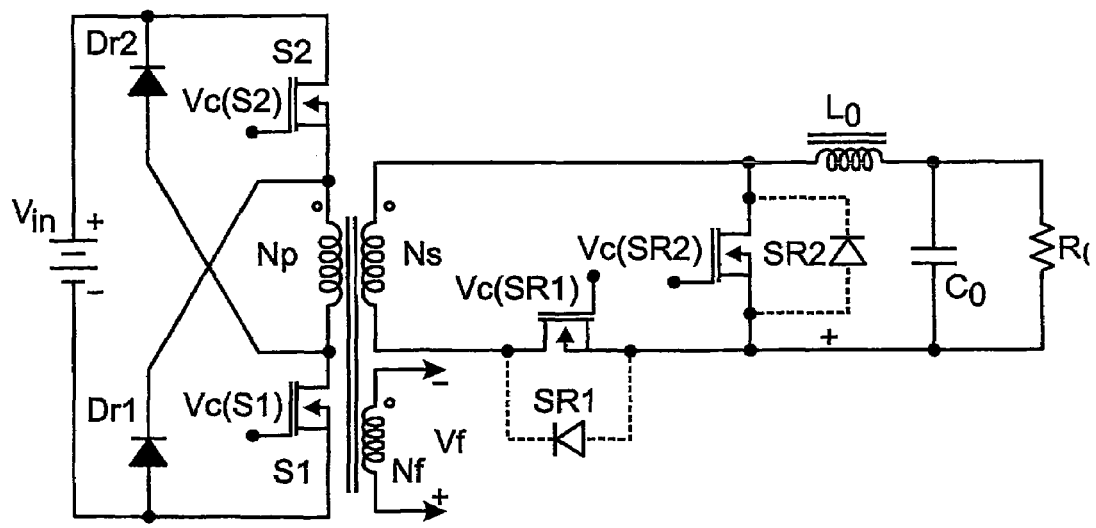

FIG. 10a illustrates a switch mode power converter in a two-transistor forward topology according to an alternative embodiment of the present invention.

Figure 10B:
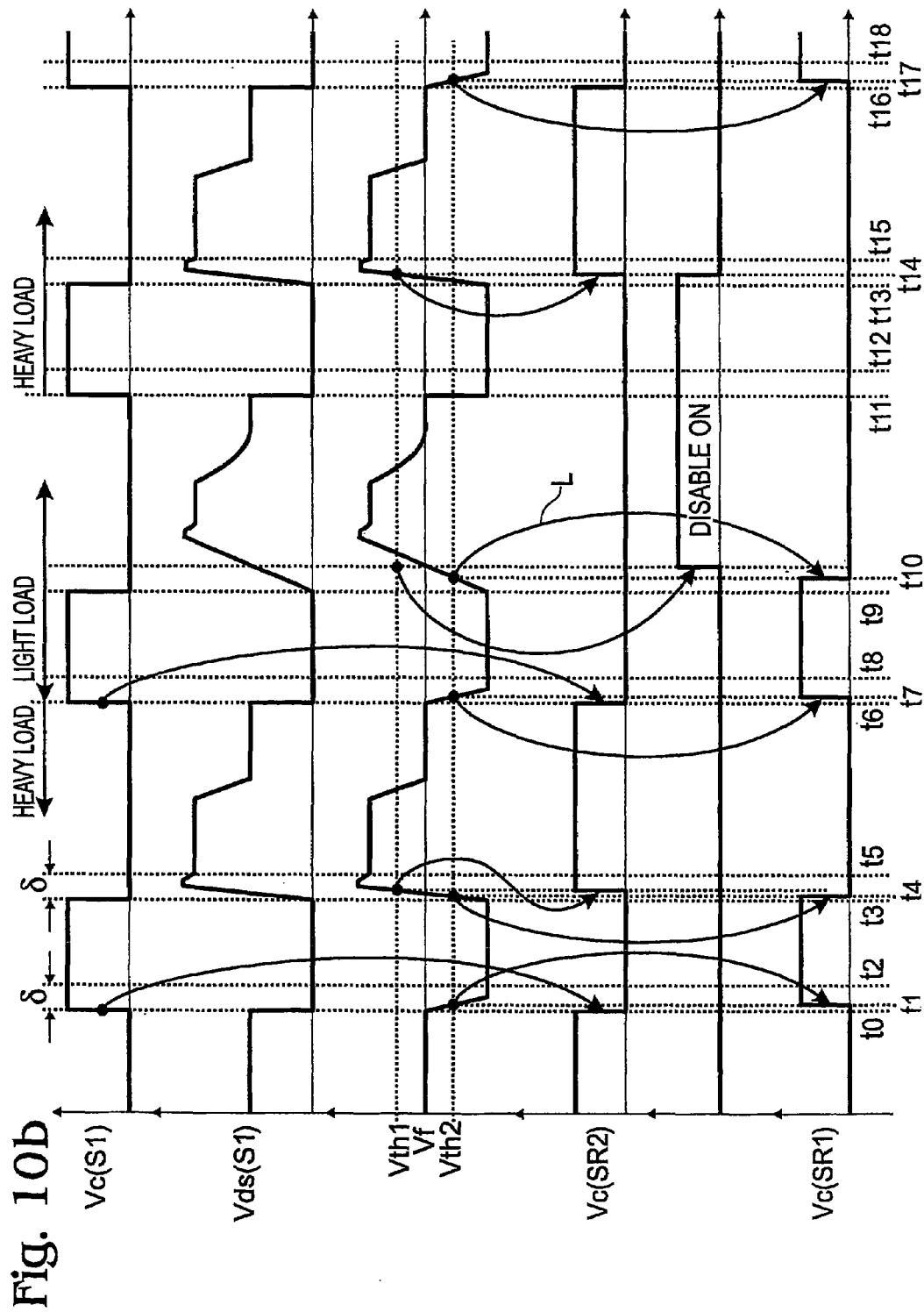

FIG. 10b illustrates a timing diagram of the waveforms of voltages and currents of the converter of FIG. 10a at different points in time.

Figure 10C:
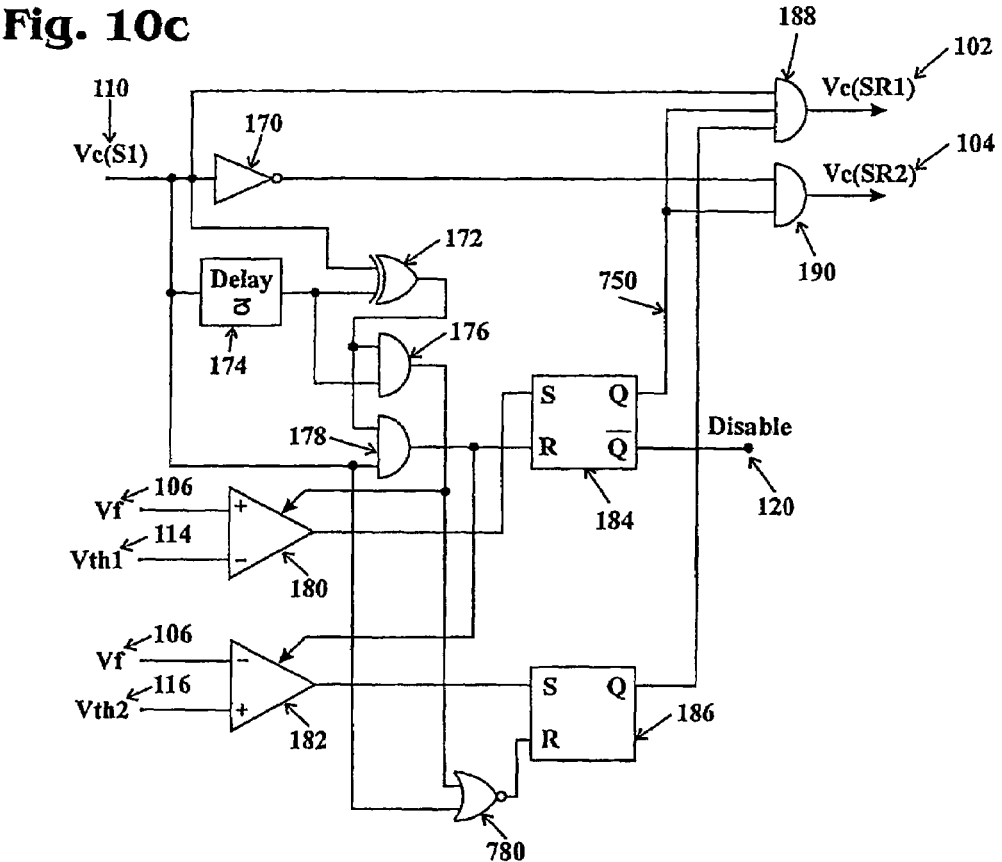

FIG. 10c illustrates the logic diagram of the converter of FIG. 10a.

Figure 11A:
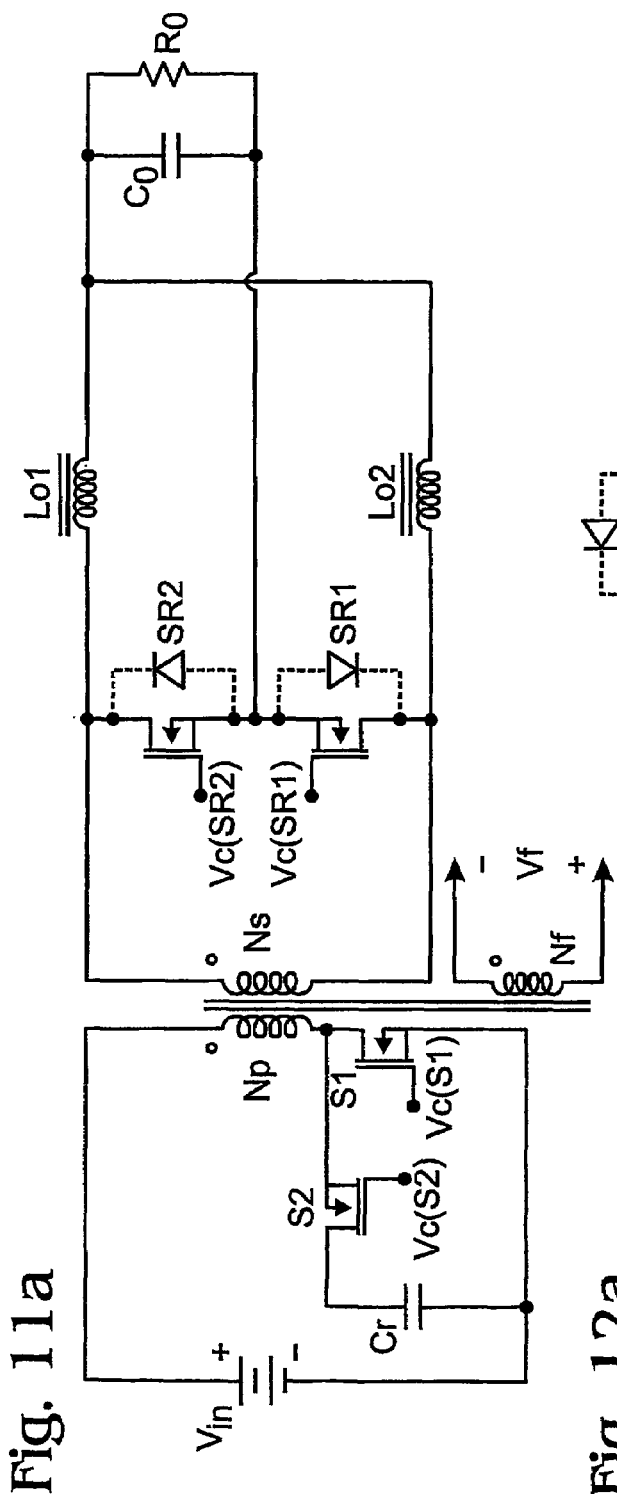

FIG. 11a illustrates a switch mode power converter in a forward-flyback topology with a current-doubler, synchronize rectification, and active clamp topology according to an alternative embodiment of the present invention.

Figure 12C:
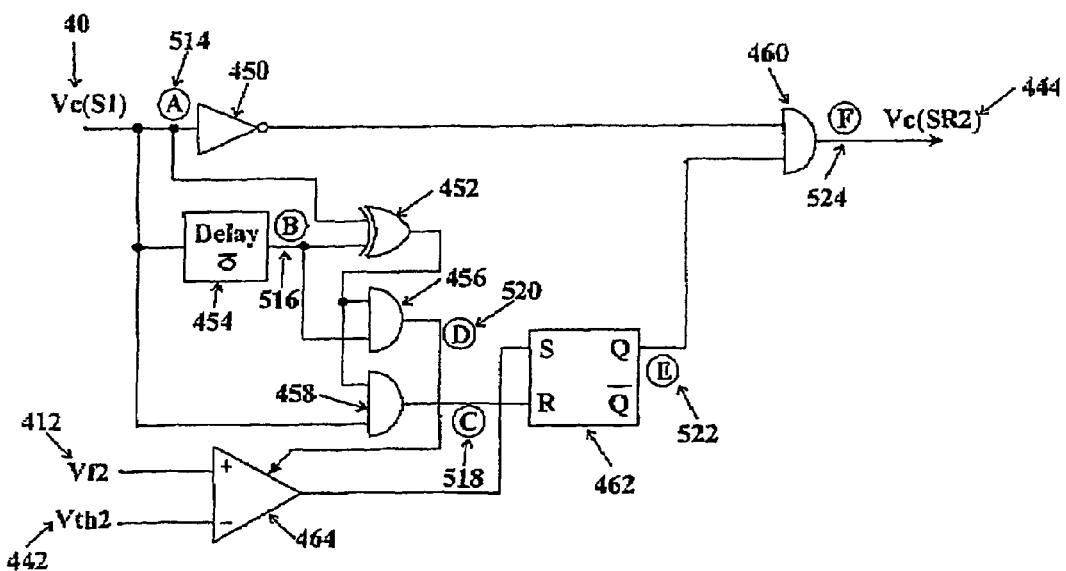
Figure 12A:
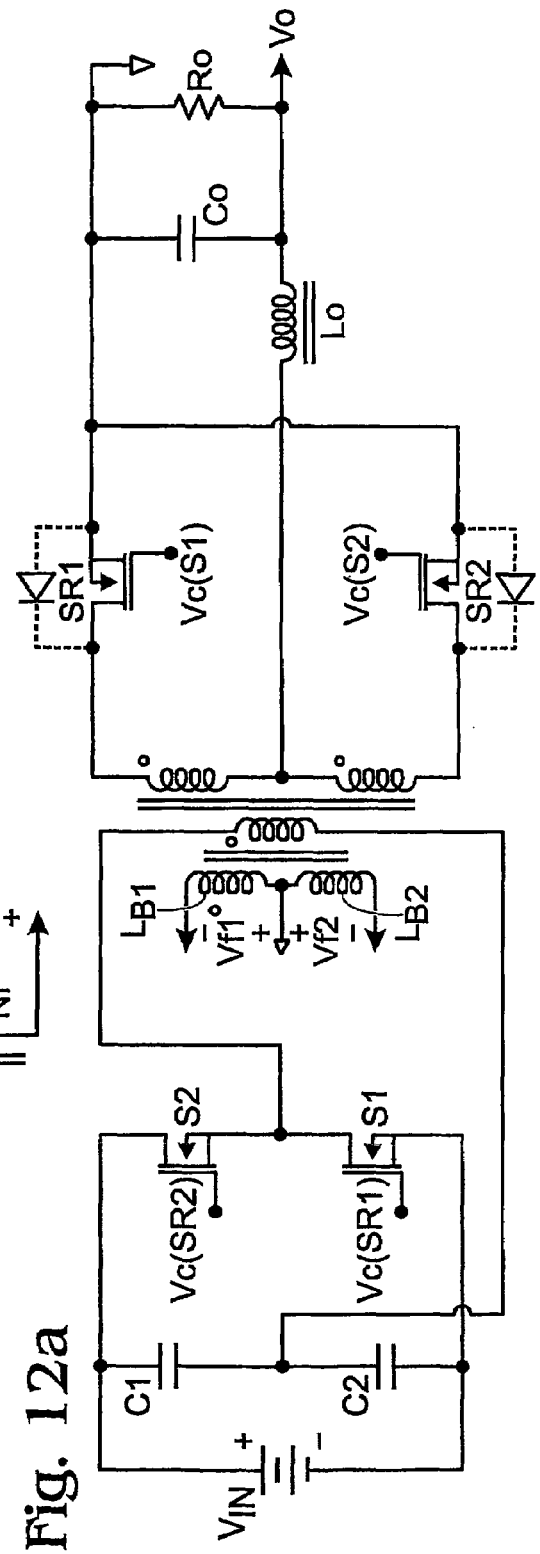
Figure 11B:
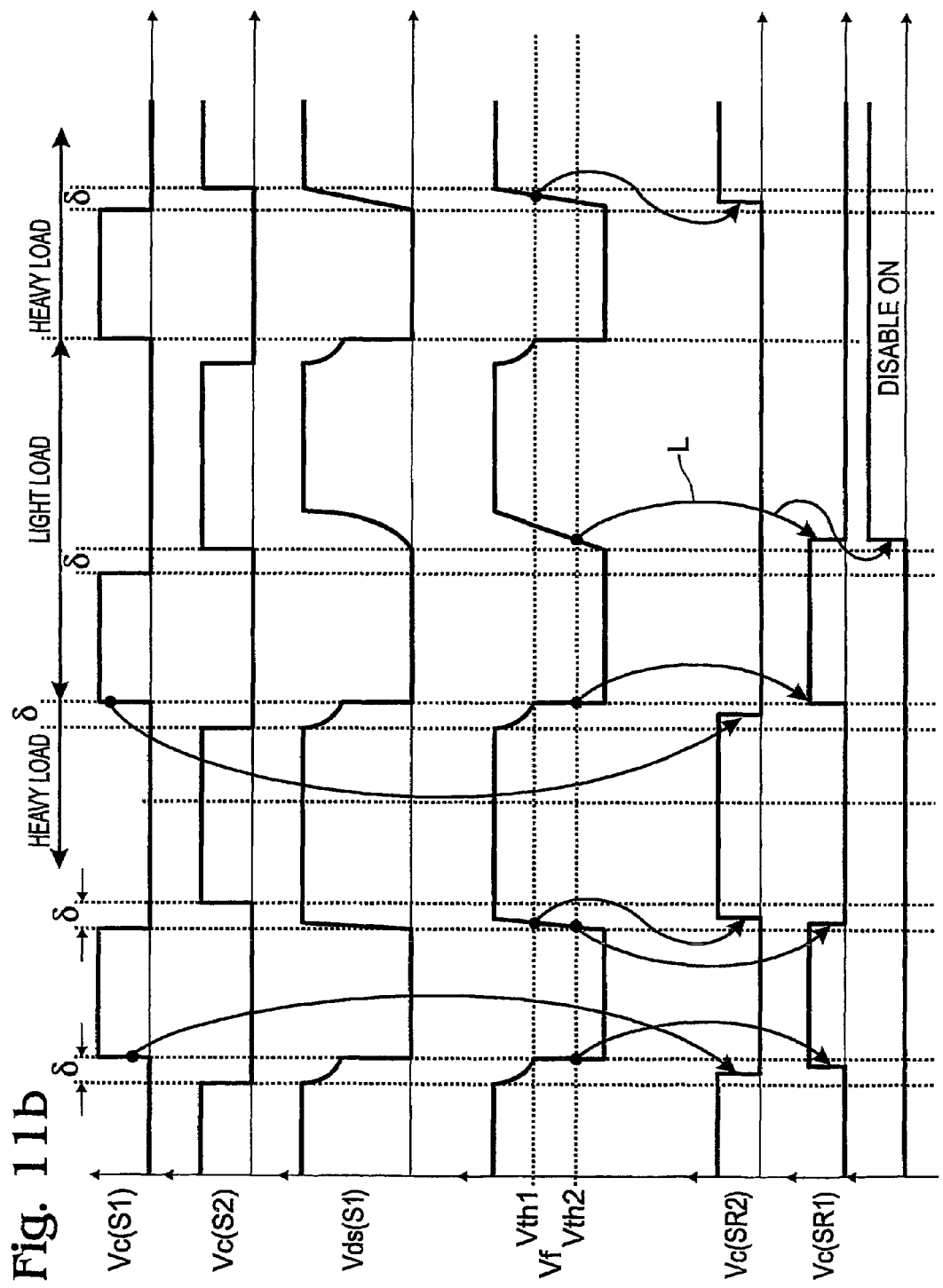

FIG. 11b illustrates a timing diagram of the waveforms of voltages and currents in the converter of FIG. 11a at different points in time FIG. 12a illustrates a switch mode power converter in half-bridge topology according to an alternative embodiment of the present invention.

FIG. 12b illustrates a timing diagram of the waveforms of voltages and currents in the converter of FIG. 12a at different points in time.

FIG. 12c illustrates a logic diagram of the converter of FIG. 12a.

Figure 12D:
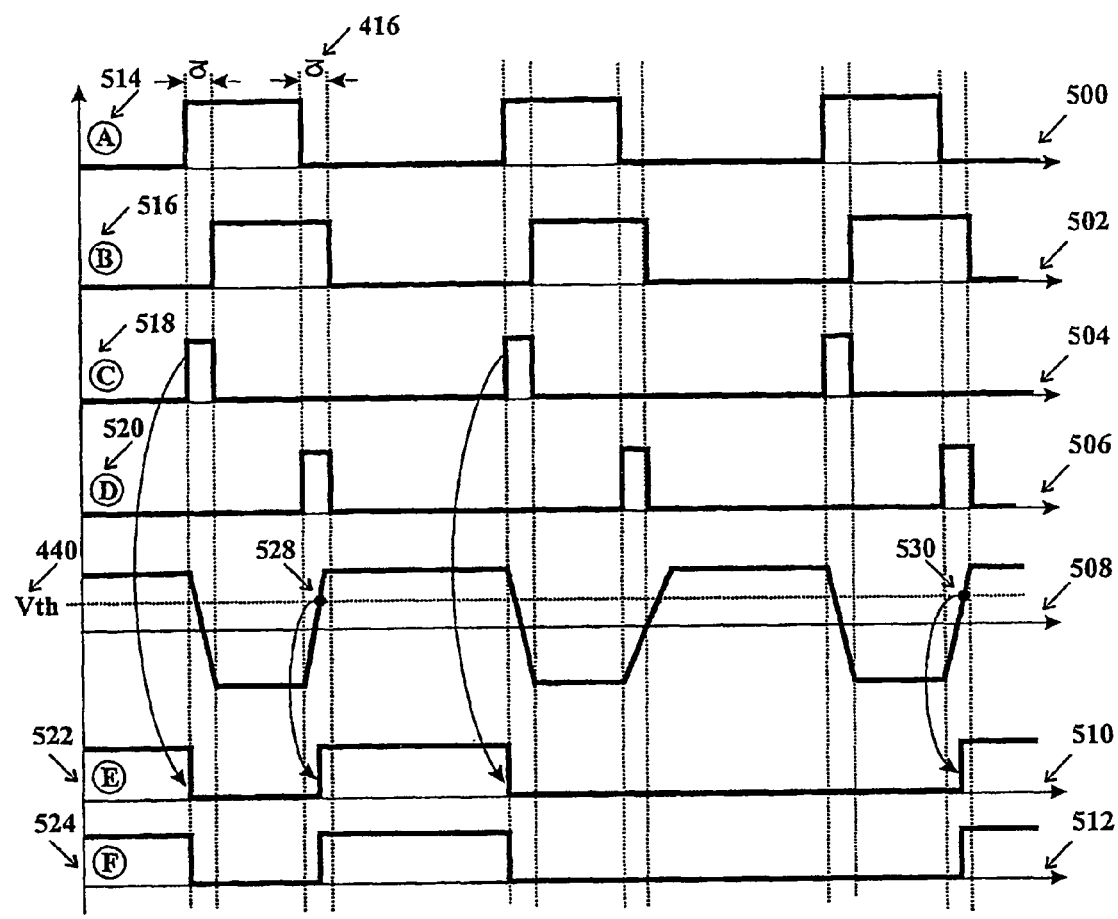

FIG. 12d illustrates a timing diagram of the logic diagram of FIG. 12e at different points in time.

DESCRIPTION

The present invention is directed to a switch mode power converter for supplying an output power to a load. The switch mode power converter employs one or more synchronous rectifiers as secondary switching devices. In one preferred embodiment, the synchronous rectifiers may be placed in parallel with discrete diodes. During light load operation, the synchronous rectifiers are disabled and current is conducted in the body diodes of the synchronous rectifiers or in the parallel discrete diodes. In one preferred embodiment, the power converter also includes a bias winding for producing a bias voltage representative of the output power, and a control circuit. Light load conditions may be detected using the bias voltage. The control circuit is for (a) determining the rate of change of the bias voltage, (b) characterizing the rate of change, and (c) controlling the control input as a result of the characterization (b).

The present invention provides the benefits of using synchronous rectifiers as secondary switches during normal load conditions. In addition, the present invention allows for the use of either parallel diodes or body diodes during light load conditions. The present invention protects against reverse current flow during light load conditions because the reverse current must be driven by a voltage that exceeds the diode cut-in voltage. Thus, in situations where two or more switch mode power converters are connected in parallel to supply a single load and the output of one converter is at a slightly lower output voltage than the others, current will not flow into the lower voltage converter in reverse because the voltage difference would normally not be sufficient to overcome the diode cut-in voltage.

Flyback Converter

FIGS. 4a-c and 5a-f respectively illustrate an idealized switched-mode flyback DC-DC converter and idealized waveforms depicting voltages and currents within the circuit at different points in time. As shown in FIG. 4a, the flyback converter is coupled to an input DC power source, which supplies an input voltage $V_{in}$, and to an output load represented by a resistor $R_L$. The flyback converter includes a switch SW on a primary side, and a diode D and a capacitor C on a secondary side of the circuit.

The flyback converter includes a transformer T which magnetically couples the primary and secondary sides of the circuit. The transformer T has primary and secondary windings, $L_1$ and $L_2$ and a transformer core TC. When a current passes through one winding, a voltage is induced in the other winding. The polarity of the induced voltage depends on how the two windings are wound and a dot convention is conventionally employed to indicate the polarity of the induced voltage. According to the dot convention, if a current enters the dotted terminal of one winding, a positive voltage will be induced at the dotted terminal of the other winding.

The switch SW in the flyback converter may be open or closed. The time period when the switch SW is closed is referred to as $T_{ON}$ or simply the "on" period and the time period when the switch is off is referred to as $T_{OFF}$ or simply the "off" period. A switching time period $T_S$ or "duty cycle" is defined as $T_S = T_{ON} + T_{OFF}$. During the on period, energy is stored in the transformer T. During the off period, the stored energy is transferred to the secondary side of the circuit. A current $I_o$ flows in the load $R_L$. during both the on and off periods. During the on period, energy that is stored in the capacitor C supports the current $I_o$.

Figure 5A:
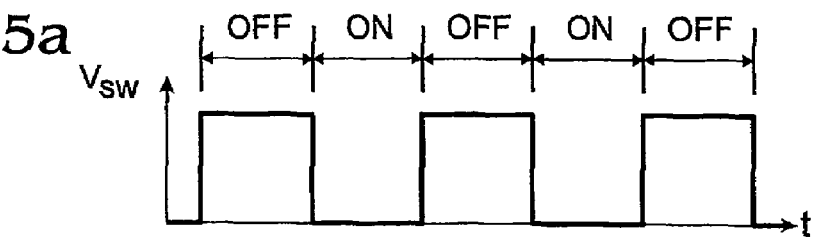
Figure 5B:
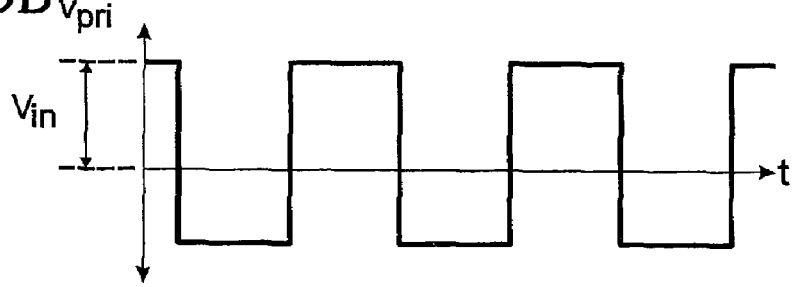
Figure 5C:
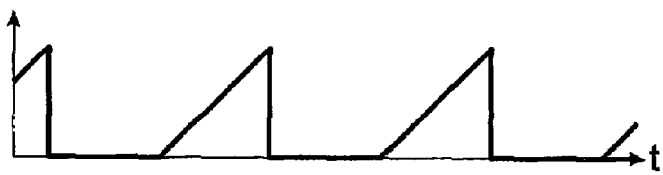
Figure 5D:
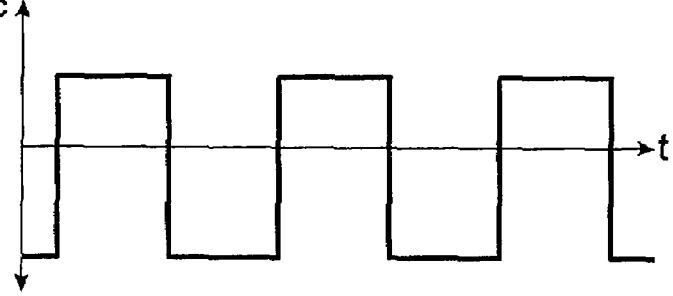
Figure 5E:
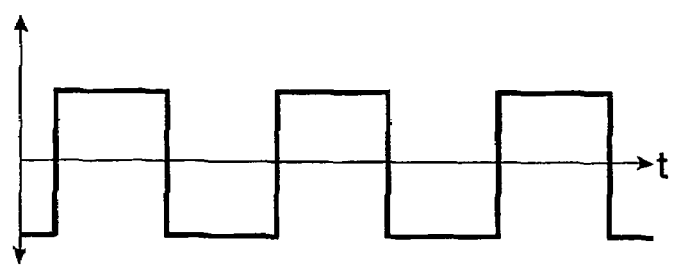
Figure 5F:

FIG. 4b illustrates how the flyback converter circuit effectively looks during an on period. A short circuit has been substituted in the figure for the switch SW because the switch is closed during the on period. When the switch SW is closed, a current $I_{pri}$ enters the dotted terminal of the primary winding $L_1$. The current $I_{pri}$ induces a voltage in the secondary winding which, according to the dot convention, is positive at its dotted terminal and as a result, the diode D is reverse-biased. The diode D has been replaced with an open circuit in FIG. 4b because it is reverse-biased. During the on period, the current $I_{pri}$ flows in the primary winding $L_1$ storing energy in the transformer T. Referring to FIGS. 5a, 5b, and 5c, it can be seen that during the on periods, the voltage $V_{SW}$ across the switch is zero, the voltage $V_{pri}$ across the primary winding is equal to the input voltage $V_{in}$, and the current $I_{pri}$ in the primary winding ramps up with time. Since the diode D is reverse-biased during the on period, the current $I_{sec}$ in the secondary winding $L_2$ is zero, as shown in FIG. 5f.

FIG. 4c illustrates how the flyback converter circuit effectively looks during an off period. An open circuit has been substituted in the figure for the switch SW because the switch is open during the off period. After the switch is opened, the polarity of the voltage $V_{pri}$ across the primary winding $L_1$ reverses which in turn causes the voltage $V_{sec}$ across the secondary winding $L_2$ to reverse its polarity. The reversal of polarity in the secondary winding $L_2$ causes a current $I_{sec}$ to flow in the secondary winding. In addition, the diode D is forward-biased during the off period as a result of the reversal of polarity in the secondary winding $L_2$. For this reason, the diode D has been replaced with a short circuit in FIG. 4c. Referring to FIGS. 5a, 5b, and 5c, it can be seen that during the off periods, the voltage $V_{SW}$ across the switch is positive, the voltage $V_{pri}$ across the primary winding is negative, and the current $I_{pri}$ in the primary winding $L_1$ is zero. Because the diode D is forward-biased during the off period, the current $I_{sec}$ in the secondary winding $L_2$ ramps down with time, as shown in FIG. 5f.

Synchronous Rectification-Flyback Topology

One preferred embodiment of the present invention is shown in FIGS. 6a-b. A flyback converter (the "SR flyback converter") which employs a synchronous rectifier is illustrated in FIGS. 6a-b and waveforms depicting voltages and currents in the circuit at different points in time are shown in FIGS. 7a-g. As shown in FIG. 6a, the SR flyback converter is coupled to an input DC power source, which supplies an input voltage $V_{in}$, and to an output load represented by a resistor $R_L$. The SR flyback converter includes a switch SW on a primary side, and a synchronous rectifier SR, a Schottky diode D, and a capacitor C on a secondary side of the circuit. In addition, the SR flyback converter includes a control circuit CC for generating a control signal $V_{C-SW}$ for the switch SW and a control signal $V_{C-SR}$ for the synchronous rectifier SR.

As shown in FIGS. 6a-b, the SR flyback converter includes a transformer T which magnetically couples the primary and secondary sides of the circuit. The transformer T has primary and secondary windings, $L_1$ and $L_2$, and a transformer core TC. The dots shown adjacent to one terminal of the primary and secondary windings, $L_1$ and $L_2$ are placed according to the dot convention. The dots for the windings are placed in the same position as those for the flyback converter of FIGS. 4a-c. The SR flyback converter additionally includes a bias winding, $L_B$. The bias winding $L_B$ is coupled to the control circuit CC so that it can provide it with a bias voltage $V_B$ and a bias current.

As with the flyback converter of FIGS. 4a-c, the switch SW in the SR flyback converter may be open or closed. Similarly, the SR flyback converter has a "duty cycle" that is defined by $T_S=T_{ON}+T_{OFF}$. Moreover, the SR flyback converter operates similarly to the flyback converter shown in FIGS. 4a-c. During the on period of the SR flyback converter, energy is stored in the transformer T and during the off period, the stored energy is transferred to the secondary side of the circuit.

Unlike the flyback converter of FIGS. 4a-c, the SR flyback converter includes the synchronous rectifier SR and has two modes of operation. In "normal" mode, the synchronous rectifier SR is enabled and in the "light load" mode, it is disabled. Under conditions when the load $R_L$ is deemed to be normal, the synchronous rectifier SR performs a switching function similar to the diode D illustrated in FIGS. 4b-c. However, under conditions when the load $R_L$ is deemed to be "light," the synchronous rectifier SR is disabled and the switching function is performed by the diode D. FIG. 6b illustrates how the SR flyback converter circuit effectively looks under light load conditions. In FIG. 6b, because the synchronous rectifier is disabled during the light load period, a short circuit has been substituted for the synchronous rectifier SR.

Referring to FIGS. 7a-b, and 7d-g, it can be seen that during the on periods, the voltage $V_{SW}$ across the switch is zero, the control signal $V_{C-SR}$ for the switch SW is high and the voltage $V_{sec}$ across the secondary winding $L_2$ is negative. Because the voltage $V_{sec}$ is negative, the diode D is reverse-biased. In addition, the control signal $V_{C-SR}$ for the synchronous rectifier SR is low, indicating that it is turned off. Because the diode D is reverse-biased and the synchronous rectifier SR is off, the currents $I_{D1}$ and $I_{SR}$ in the diode D and the synchronous rectifier SR, respectively, are zero.

FIGS. 7b, 7d, and 7e show arrows that will be understood by one skilled in the art, but which may require explanation for others. The arrows illustrate cause and effect relationships. The solid circle at the tail of an arrow indicates a signal transition or level that causes some action and the point of the arrow indicates the action caused. For instance, the transition of $V_{S-SW}$ (see FIG. 7b) from a low to a high at the start of on periods 1 and 2 causes the signal $V_{C-SR}$ to transition from a high to a low at the times indicated in FIG. 7e.

The SR flyback converter operates in one of its two modes of operation during the off period. Referring to FIGS. 7a-b, it can be seen that the voltage $V_{SW}$ across the switch is positive and the control signal $V_{C-SW}$ for the switch SW is low during the off periods. The mode of operation for normal load conditions is shown for off periods 1 and 2, and the mode for light load conditions is shown for off period 3. Referring to FIG. 7e, it can be seen that, during the normal load off periods 1 and 2, the control signal $V_{C-SR}$ for the synchronous rectifier SR is high, indicating that the SR is functioning as a closed switch. Referring to FIG. 7f, it can be seen that the current $I_{SR}$ flowing in the synchronous rectifier ramps down with time during off periods 1 and 2. Referring now to FIG. 7e, it can be seen that, during the light load off period 3, the control signal $V_{C-SR}$ for the synchronous rectifier SR is low, indicating that it is functioning as an open switch. Referring to FIG. 7g, it can be seen that current $I_{D1}$ in the diode ramps down with time during the light load off period 3. As FIGS. 7f-g show, current flows in either the synchronous rectifier SR or the diode during the off time.

FIG. 7d shows the voltage $V_{sec}$ across the secondary winding $L_2$. A reference threshold voltage $V_{TH}$ is also shown. In contrast to the idealized waveform of FIG. 5d which shows the voltage $V_{sec}$ across the secondary winding $L_2$ becoming instantly positive at the end of the on period, the voltage $V_{sec}$ that is shown in FIG. 7d illustrates a more realistic view of the transition that occurs at the end of the on period. The voltage does not rise instantly; instead, it rises with a delay that defines an upward sloping line. (The voltage $V_{sec}$ shown is somewhat exaggerated for purposes of clarity of illustration.) At the end of the on period, a $V_{DELAY}$ signal goes high, as shown in FIG. 7c. After a delay period, the $V_{DELAY}$ signal goes low. During the delay period, the voltage $V_{sec}$ is compared with the threshold voltage $V_{TH}$, as shown in FIG. 7e. The control signal $V_{C-SR}$ for the synchronous rectifier SR is enabled if the voltage $V_{sec}$ becomes greater than the threshold voltage $V_{TH}$ during the delay period, otherwise, the control signal $V_{C-SR}$ is disabled.

FIG. 8 shows one embodiment of a control circuit CC, which includes a comparator 100, an RS latch 102, a delay block 104, an inverter 106, and AND gates 108 and 110. The control signal $V_{C-SW}$ is coupled to the inputs of the RS latch 102, the delay block 104, and the inverter 106. The voltage $V_{sec}$ is coupled to the non-inverting input of the comparator 100 and the threshold voltage $V_{TH}$ is coupled to inverting input of the comparator 100. The output of AND gate 110 is the control signal $V_{C-SR}$ for the synchronous rectifier SR.

In operation of the control circuit CC shown in FIG. 8, the control signal $V_{C-SW}$ is low during an off period. The control signal $V_{C-SW}$ causes a low signal to be placed on the R input of RS latch 102. In addition, it causes a delay period to begin at the start of the off period. During the delay period, the delay block causes a high signal to be placed on one input of the AND gate 108. An inverted version of $V_{C-SW}$ (a high signal) is placed on the other input of the AND gate 108 during the off period, as a result of the inversion performed by inverter 106. Thus, during the delay period, the output of the AND gate 108 is high, which enables the comparator 100.

When the delay period ends, the comparator 100 is disabled. At the start of the off period, the voltage $V_{sec}$ across the secondary winding $L_2$ is negative, beginning its rise to a positive voltage. Thus, the output of the comparator 100 is low at the start of the off period and the output of the comparator 100 will go high when the voltage $V_{sec}$ exceeds the threshold voltage $V_{TH}$. If it does go high during the delay period, the RS latch 102 will enter a set state, latching a high signal on its output and the input to the AND gate 110. Because the other input on the AND is high as a result of the inversion of signal $V_{C-SW}$, the output of AND gate 110 will also go high during the off period. Since this output is control signal $V_{C-SR}$ for the synchronous rectifier SR, it is turned on during the off period.

If, on the other hand, the voltage $V_{sec}$ does not exceed the threshold voltage $V_{TH}$ during the delay period, the comparator 100 will be disabled while its output is low. As a result, the RS latch 102 will remain in a latched state, latching a low signal on its output and the input to the AND gate 110. Since, the AND gate's output control signal $V_{C-SR}$ is low, the synchronous rectifier SR will be turned off during the off period.

Use of the Voltage in the Bias Winding

In the description of the operation of the SR flyback converter illustrated in FIGS. 6a-b, it was shown how the voltage $V_{sec}$ across the secondary winding $L_2$ is compared with the threshold voltage $V_{TH}$ during a delay period to determine whether the control signal $V_{C-SR}$ should be enabled or disabled. The use of voltage $V_{sec}$ illustrates but one preferred voltage that may be compared with the threshold voltage $V_{TH}$ according to the present invention. In another preferred embodiment of the present invention, the bias voltage $V_B$, that is provided by the bias winding $L_B$ shown in FIGS. 6a-b, may be compared with the threshold voltage $V_{TH}$.

Transformers generally have leakage inductance, usually modeled as an additional inductance $L_d$ in series with the secondary winding $L_2$. Any inductive element, such as the leakage inductance $L_d$ will resist and hence delay any change in the current flowing through the element. As previously described, the polarities of the voltages across the primary winding $L_1$ and the secondary winding $L_2$ reverse when the primary switch is opened. However, these polarity changes do not occur precisely simultaneously. The change in polarity occurs first in the primary winding $L_1$, with the change in polarity in the secondary winding $L_2$ occurring at a slower rate than in the primary. The rate of change of the polarity in the secondary winding $L_2$ depends on the leakage inductance $L_d$ as well as the amplitude of the output current and other factors.

It is believed that the bias voltage $V_B$ provided by the bias winding $L_B$ reflects a polarity change with less delay from that in the primary winding $L_1$, than the voltage $V_{sec}$ across the secondary winding $L_2$. This property of the bias voltage $V_B$ is believed to be due to the fact that the bias winding $L_B$ carries a current that is low in amplitude in comparison to the output current. The bias winding $L_B$ is typically employed to provide electric power to the control circuitry of the power converter, circuitry which requires only a modest amount of current. For this reason, it is believed that the bias voltage bias $V_B$ may be advantageously compared with the threshold voltage $V_{TH}$ to provide an earlier indication of when the polarity across the primary winding $L_1$ has changed. As mentioned, methods for controlling secondary synchronous rectifier switches that rely on sensing output current may not drive the synchronous rectifiers with adequate precision and they require a current sensor. Precision may be lacking because the output current can vary greatly during the delay period. In contrast, use of the bias voltage bias $V_B$ provides an earlier indication of the polarity change in the primary winding $L_1$ allowing the synchronous rectifiers to be driven more precisely. In addition, the use of the bias voltage $V_B$ provides the advantage that is does not require an additional current sensor component, as it employs an existing component of the power converter, namely the bias winding $L_B$.

Figure 1:
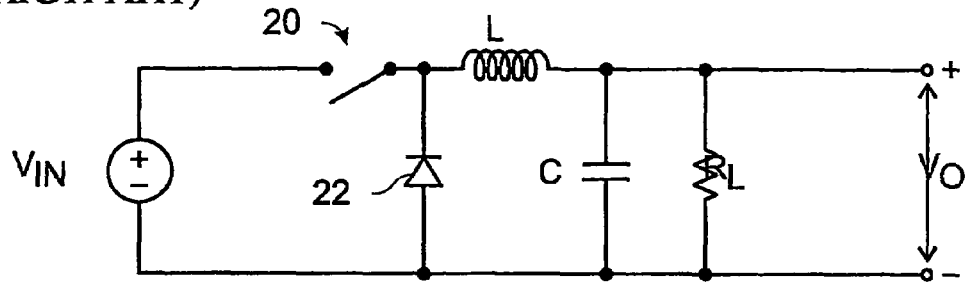
FIG. 1 illustrates a known switch mode power converter in a buck topology.
Figure 2:
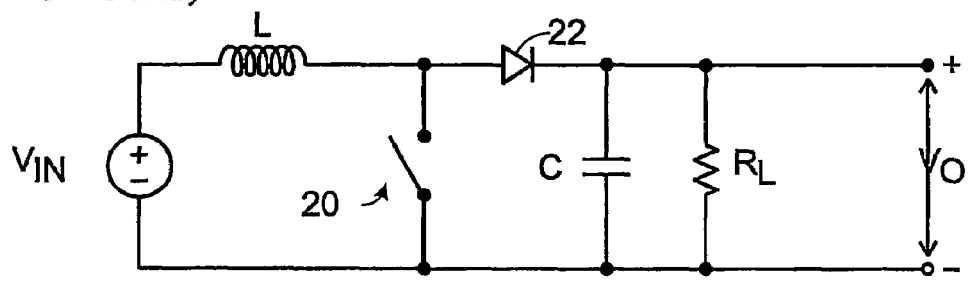
FIG. 2 illustrates a known switch mode power converter in a boost topology.
Figure 3:
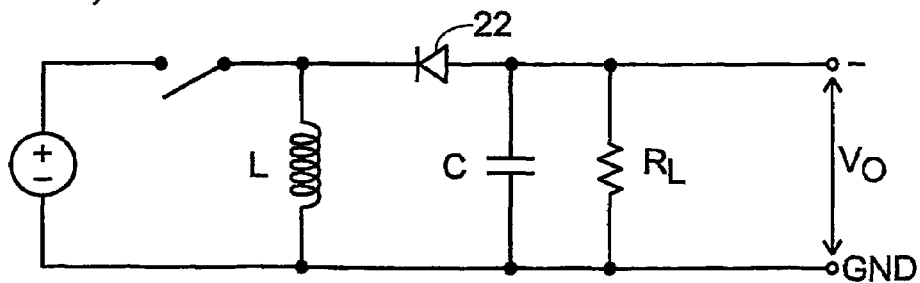
FIG. 3 illustrates a known switch mode power converter in a buck-boost topology.

It should be understood that the present invention may be practiced with a bias winding $L_B$ located on either the primary or secondary side of the transformer. In addition, the bias winding $L_B$ may be additionally employed to supply power to a control or other circuit, or the bias winding $L_B$ may be employed solely for the purpose of providing a bias voltage $V_B$ for comparison with the threshold voltage $V_{TH}$. In addition, the bias winding $L_B$ may be all or part of either the primary or secondary windings $L_1$, $L_2$ of the transformer. Further, the bias winding $L_B$ may be provided in a topology that does not include a transformer, such as those shown in FIGS. 1-3.

Control of Synchronous Rectifiers in Other Topologies

The method and apparatus of the present in invention for controlling a synchronous rectifier used as secondary switch has been described herein in the context of one preferred embodiment, namely the SR flyback converter. It should be understood, however, that the present invention was described in the context of the SR flyback converter for the purpose of clarity, that is, the features of the invention may be more readily understood in the context of a topology that does not include a large number of components and signals. But it should be understood that the present invention is not limited to the SR flyback converter. As will be appreciated by one skilled in the art, the present invention may be advantageously employed in any topology which uses synchronous rectifiers. Specifically, the present invention may be employed in topologies that include a transformer and in those that do not. Further, the present invention may be employed in those topologies that have been previously described or referred to herein as well as in other topologies known in the art. FIGS. 10a-b, 12a-b, and 13a-b, which are briefly described below, provide additional illustrations of topologies in which the present invention may be advantageously employed.

FIG. 10a illustrates a switch-mode power converter that is based on a known two-transistor forward topology, according to one alternative preferred embodiment of the present invention. In known forward switch-mode power converters, the drive signals for the secondary switches such as Vc(SR1) and Vc(SR2) are determined by the drive signals for the primary switches and the output current. A disadvantage of the known half-bridge converter is that the synchronous rectifiers may be turned on before the voltage changes in the secondary winding. In addition, the current sensor is an extra component, a component that introduces an impedance in the output, an impedance which causes a reduction in efficiency.

Referring to FIG. 10a, the parallel diodes shown on the secondary side and coupled to the circuit by dashed lines may be either body diodes of the synchronous rectifiers SR1 and SR2 or additional discrete diodes. The half-bridge converter includes a bias winding $N_f$ from which a bias voltage $V_f$ is derived. A control circuit, which is not shown in FIG. $10_a$, generates two drive signals, Vc(SR1) and Vc(SR2), that are shown and used to control synchronous rectifiers SR1 and SR2. This control circuit functions in a similar manner to the control circuit previously described for the SR flyback converter, however, it is not identical to the previously described control circuit. The operation of this control circuit can be best understood by reference to FIG. 10b.

As can be seen in FIG. 10b, the bias voltage $V_f$ is compared with threshold voltages $V_{TH1}$ and $V_{TH2}$ during first and second delay periods δ. From the arrows having their tails on the transitions of either the primary control voltage Vc(S1) or the bias voltage $V_f$ and their heads pointing to transitions of Vc(SR1) and Vc(SR2), it can be seen that when the bias voltage $V_f$ transitions past the threshold voltage during a delay period δ, the effect is a change in the level of the control signals for the synchronous rectifiers Vc(SR1) and Vc(SR2). The signal Vc(SR2) is driven low when Vc(S1) goes high and is driven high when $V_f$ exceeds the threshold voltage during the delay period 8. The signal Vc(SR1) is driven high when $V_f$ becomes more negative than the threshold voltage during the delay period δ and is driven low when $V_f$ becomes more positive than the threshold voltage during the delay period δ. The foregoing transitions correspond to periods when the load, represented by $R_O$, is considered heavy. During periods when the load is considered light, it can be seen from an arrow L having its tail on the dotted line adjacent to the rising edge of a bias voltage $V_f$ transition and its head on the transition of the disable signal to "disable on" that the control signals Vc(SR1) and Vc(SR2) are made inactive following this transition. In other words, when the delay in the rise in the bias voltage $V_f$ is such that it does not exceed the threshold voltage $V_{TH1}$ during the delay period δ, the synchronous rectifiers SR1 and SR2 are disabled and currents are conducted instead through the parallel diodes on the secondary side which are coupled to the circuit by dashed lines.

In FIG. 10C is presented the logic diagram associated with the timing diagram of FIG. 10B. In FIG. 10C the Vc(S1) 110 is applied to an Inverter 170 and after that to an AND gate 190. If the enable signal 750 is high then the Vc(SR2) 104 is the inverted signal of Vc(S1) though the rising edge will occur only during the time interval δ after the falling edge of 110, when Vf 106 is higher than Vth1 114. If this condition does not occur during the time interval 8 the enable will have a low logic level and the output of 190 will be low as well. The gate 176 enables the comparator 180 during the time interval δ.

During the time interval δ after the rising edge of 110, and during the time interval δ after the falling edge of 110, the comparator 182 is activated. If Vf 106 is lower than Vth2 116, then the Q output of 186 will be high and the output of gate 188 will be high as well. This controls the rising edge of Vc(SR1) 102.

The falling edge of 102 will occur during the time interval δ after the falling edge of Vc(S1). During that time 182 will be activated again. If Vf 106 is higher than Vth2 116 during the time interval δ then the output Q of 186 will go logic low and the output of 188 will go low as well. In the event wherein this condition does not occur during the time interval δ then 186 will be reset and the output Q of 186 will go logic low and the output of 188 will go low. The time interval δ can be different after the falling edge and rising edge of the primary control switch.

FIG. 11a illustrates a switch mode power converter in a topology known as forward-flyback with current-doubler, synchronizous rectification, and active clamp according to an alternative embodiment of the present invention. FIG. 11a is a representative example of an asymmetrical topology. In asymmetrical topologies, one secondary switch conducts during the forward transfer of power and one secondary switch conducts during the flyback transfer. The method and apparatus of the present invention may be advantageously employed in controlling the secondary switch that conducts during the flyback transfer.

Referring to FIG. 11a, the parallel diodes shown on the secondary side and coupled to the circuit by dashed lines may be either body diodes of the synchronous rectifiers SR1 and SR2 or additional discrete diodes. The two-transistor forward converter includes a bias winding $N_f$ from which a bias voltage $V_f$ is derived. A control circuit, which is not shown in FIG. 10a, generates two drive signals, Vc(SR1) and Vc(SR2), that are shown and used to control synchronous rectifiers SR1 and SR2. This control circuit functions in a similar manner to the control circuit previously described for the SR flyback converter, however, it is not identical to the previously described control circuit. The operation of this control circuit can be best understood by reference to FIG. 11b.

FIG. 11b shows a timing diagram of the waveforms of voltages and currents in the circuit of FIG. 11a at different points in time. As can be seen in FIG. 11, the bias voltage $V_f$ is compared with threshold voltages $V_{TH1}$ and $V_{TH2}$ during a first and second delay periods δ. From the arrows having their tails on transitions of either the primary control voltage Vc(S1) or the bias voltage $V_f$ and their heads pointing to transitions of Vc(SR1) and Vc(SR2), it can be seen that when the bias voltage $V_f$ transitions past the threshold voltage during a delay periods δ, the effect is a change in the level of the control signals for the synchronous rectifiers Vc(SR1) and Vc(SR2). The signal Vc(SR2) is driven low when Vc(S1) goes high and is driven high when $V_f$ exceeds the threshold voltage during the delay periods δ. The signal Vc(SR1) is driven high when $V_f$ becomes more negative than the threshold voltage during the delay period δ and is driven low when $V_f$ becomes more positive than the threshold voltage during the delay period δ. The foregoing transitions correspond to periods when the load, represented by $R_o$, is considered heavy. During periods when the load is considered light, it can be seen from an arrow L having its tail on the rising edge of a bias voltage $V_f$ transition and having two heads, one on the falling edge of Vc(SR1) and the second head on the transition of the disable signal to "disable on" that the control signals Vc(SR1) and Vc(SR2) are made inactive following this transition. In other words, when the delay in the rise in the bias voltage $V_f$ is such that it does not exceed the threshold voltage $V_{TH2}$ during the delay period δ, the synchronous rectifiers SR1 and SR2 are disabled and currents are conducted instead through the parallel diodes on the secondary side which are coupled to the circuit by dashed lines.

FIG. 12a illustrates a switch mode power converter in a half-bridge topology, according to yet another alternative embodiment of the present invention. FIG. 12a is a representative example of a symmetrical topology. FIG. 12b shows a timing diagram of the waveforms of voltages and currents in the circuit at different points in time.

It will be recalled that in symmetrical topologies both secondary switches conduct during the flyback transfer. In addition, both secondary switches transfer energy during the forward transfer. At the end of the forward cycle when one of the primary switches turns off, there is a voltage rise across the primary switches, a voltage rise which is a function of the loading conditions. As the load increases, the slope of the voltage rise across the primary switches also increases.

Referring to FIG. 12a, the parallel diodes shown on the secondary side and coupled to the circuit by dashed lines may be either body diodes of the synchronous rectifiers SR1 and SR2 or additional discrete diodes. The half-bridge converter includes bias windings $L_{B1}$ and $L_{B2}$ from which bias voltages $V_{f1}$ and $V_{f2}$ are derived. A control circuit, which is not shown in FIG. 10a, generates two drive signals, Vc(SR1) and Vc(SR2), that are shown and used to control synchronous rectifiers SR1 and SR2. This control circuit functions in a similar manner to the control circuit previously described for the SR flyback converter, however, it is not identical to the previously described control circuit. The operation of this control circuit can be best understood by reference to FIG. 12b.

As can be seen in FIG. 12b, the bias voltages $V_{f1}$ and $V_{f2}$ are compared with threshold voltages $V_{TH1}$ and $V_{TH2}$ during a delay period δ. From the arrows having their tails on the transitions of either the primary control voltages Vc(S1) or Vc(S2), or the bias voltages $V_{f1}$ and $V_{f2}$ and their heads pointing to transitions of Vc(SR1) and Vc(SR2), it can be seen that when the bias voltages $V_{f1}$ and $V_{f2}$ transition past the threshold voltages during a delay period δ, the effect is a change in the level of the control signals for the synchronous rectifiers Vc(SR1) and Vc(SR2). The signal Vc(SR2) is driven low when Vc(S1) goes high and is driven high when $V_{f2}$ exceeds the threshold voltage during the delay period δ. The signal Vc(SR1) is driven low when Vc(S2) goes high and is driven high when $V_{f1}$ becomes more positive than the threshold voltage during the delay period δ. The foregoing transitions correspond to periods when the load, represented by $R_o$, is considered heavy. During periods when the load is considered light, it can be seen from an arrow L having its tail on the dotted line adjacent to the rising edge of a bias voltage $V_{f2}$ transition and its head on the transition of the disable signal to "disable (SR2) and disable (SR1)" that the control signals Vc(SR1) and Vc(SR2) are made inactive following this transition. In other words, when the delay in the rise in the bias voltage $V_{f1}$ is such that it does not exceed the threshold voltage $V_{TH1}$ during the delay period δ, the synchronous rectifiers SR1 and SR2 are disabled and currents are conducted instead through the parallel diodes on the secondary side which are coupled to the circuit by dashed lines.

The present invention may be advantageously employed in controlling both of the secondary switches during the flyback transfer. It will be noted that the bias voltage may be sensed in either the high current secondary winding or in the lower current windings shown on the primary side. FIG. 12b shows a timing diagram of the waveforms of voltages and currents in the circuit at different points in time.

In FIG. 12C is presented the logic diagram which controls the Synchronized Rectifiers according with the time diagram of FIG. 12B. The logic diagram of FIG. 12C is for Vc(SR2) but it is identical for the Vc(SR1) with the difference that the input signal in A 514 will be Vc(S2) and $V_{f1}$ will replace the $V_{f2}$ and the Vth2 442 will be replaced by Vth1.

The key waveforms of logic diagram of FIG. 12C is presented in FIG. 12D. On line 500 is presented the input signal A 514, on line 502 is presented the signal after the delay cell 454. The output signal 518 of the gate 458 is connected to the reset input of 462. The output signal 520 of the gate 456 is enabling the comparator 464 during the time interval δ 416. If the output of 464 is high during 416 then Q output of 462 goes high and Vc(SR2) goes high as well. In the event wherein the output of 464 is not high during 416, then the output Q of 462 is maintained low and the Vc(SR2) skips the rising edge during this cycle.

FIG. 9a shows a known switch-mode power converter in a half-bridge topology. The control signals Vc (SR1) and Vc (SR2) for the synchronous rectifiers SR1 and SR2 are determined by the control signals for the primary switches Vc (S1) and Vc (S2). The known power converter requires a current sensor shown on the line to the Load Ro. A comparator compares the sensed in current to a reference current and enables or disables the control signals based on this comparison.

FIG. 9b shows a switch-mode power converter in a half-bridge topology according to the present invention. The control signals for the secondary rectifiers SR1 and SR2 are determined by the control signals for the primary switches Vc (S1) and Vc (S2), and by the rate of change of the voltage $V_B$ in the bias winding. As previously described, under conditions when the load $R_o$ is heavy or normal the rate of use of the voltage is such that the control signals for the synchronous rectifiers are enabled. Under conditions of light load $R_o$, the synchronous rectifiers are disabled.

The terms and expressions that have been employed in the foregoing specification are used as terms of description and not of limitation, and are not intended to exclude equivalents of the features shown and described or portions of them. The scope of the invention is defined and limited only by the claims that follow.

The invention claimed is:

1. A power converter for supplying an output power to a load, comprising:
   a switching device having a switching input, a switching output, and a control input for enabling or disabling said switching device from conducting current from said switching input to said switching output; and
   a network wherein said switching device input, said switching device output, and the load are connected together in a circuit;
   a bias winding in said circuit for producing a bias voltage representative of the output power; and
   a control circuit for (a) determining the rate of change of said bias voltage, (b) characterizing said rate of change, and (c) controlling said control input as a result of the characterization (b);
   the control circuit being responsive to the characterized bias voltage rate of change to control the switching device and
   (i) effect a heavy load mode of operation of the power converter when the rate of change is above a predetermined level and
   (ii) effect a light load mode of operation of operation of the power converter when the rate of change is below the predetermined level.

2. The power converter of claim 1, further comprising a power input portion and a power output portion for providing said output power, wherein said circuit is in said power output portion.

3. The power converter of claim 2, further comprising a connecting portion for coupling said power input portion to said power output portion, wherein said connecting portion includes an inductor as part of said power output portion, wherein said bias winding is coupled in series with said inductor.

4. The power converter of claim 3, wherein said connecting portion includes a transformer having a primary winding as part of said power input portion and a secondary winding which includes said inductor.

5. The power converter of claim 1, wherein said control circuit is adapted so that the determination (a) includes comparing said bias voltage at a selected time relative to a selected starting value of said bias voltage, and so that the characterization (b) includes comparing the change in said bias voltage in (a) to a reference.

6. The power converter of claim 2, wherein said control circuit is adapted so that the determination (a) includes comparing said bias voltage at a selected time relative to a selected starting value of said bias voltage, and so that the characterization (b) includes comparing the change in said bias voltage in (a) to a reference.

7. The power converter of claim 3, wherein said control circuit is adapted so that the determination (a) includes comparing said bias voltage at a selected time relative to a selected starting value of said bias voltage, and so that the characterization (b) includes comparing the change in said bias voltage in (a) to a reference.

8. The power converter of claim 4, wherein said control circuit is adapted so that the determination (a) includes comparing said bias voltage at a selected time relative to a selected starting value of said bias voltage, and so that the characterization (b) includes comparing the change in said bias voltage in (a) to a reference.

9. The power converter of claim 5, wherein said characterization (b) includes determining whether the rate of change is either high or low compared to said reference.

10. The power converter of claim 6, wherein said characterization (b) includes determining whether the rate of change is either high or low compared to said reference.

11. The power converter of claim 7, wherein said characterization (b) includes determining whether the rate of change is either high or low compared to said reference.

12. The power converter of claim 8, wherein said characterization (b) includes determining whether the rate of change is either high or low compared to said reference.

13. In a power converter, a method for supplying an output power to a load, comprising the steps of:
    providing a power input portion;
    providing a power output portion comprising a switching device having a switching input, a switching output, and a control input for enabling or disabling said switching device from conducting current from said switching input to said switching output, and a network wherein said switching device input, said switching device output, and the load are connected together in a circuit;
    providing a bias voltage representative of the output power;
    determining the rate of change of said bias voltage;
    characterizing said rate of change; and
    controlling said control input as a result of said step of characterizing to control the switching device and
        (i) effect a heavy load mode of operation of the power converter when the rate of change is above a predetermined level and
        (ii) effect a light load mode of operation of the power converter when the rate of change is below the predetermined level.

14. The method of claim 13, wherein said step of determining includes comparing said bias voltage at a selected time relative to a selected starting value of said bias voltage, and wherein said step of characterizing includes comparing the change in said bias voltage in said step of determining to a reference.

15. The method of claim 14, wherein said step of characterizing includes determining whether the rate of change is either high or low compared to said reference.

16. A power converter for supplying an output power to a load, comprising:
    a magnetic storage element;
    a switch on a primary side of the magnetic storage element;
    a synchronous rectifier on a secondary side of the magnetic storage element having a switching input, a switching output and a control input for enabling or disabling said synchronous rectifier from conducting current from said switching input to said switching output;
    a network wherein said switching input, said switching output and the load are connected together in a circuit;
    a bias winding in said circuit for producing a bias voltage representative of the output power; and
    a control circuit operatively connected to:
        (a) determine the rate of change of said bias voltage,
        (b) characterize said rate of change as indicative of a light or heavy load on the power converter, and
        (c) control said control input as a result of the characterization (b).

17. The power converter of claim 16, further comprising a power input portion and a power output portion for providing said output power, wherein said circuit is in said power output portion.

18. The power converter of claim 17, further comprising a connecting portion for coupling said power input portion to said power output portion, wherein said connecting portion includes an inductor as part of said power output portion, wherein said bias winding is coupled in series with said inductor.

19. The power converter of claim 18, wherein said connecting portion includes a transformer having a primary winding as part of said power input portion and a secondary winding which includes said inductor.

20. The power converter of claim 16, wherein said control circuit is adapted so that the determination (a) includes comparing said bias voltage at a selected time relative to a selected starting value of said bias voltage, and so that the characterization (b) includes comparing the change in said bias voltage in (a) to a reference.

21. The power converter of claim 20, wherein said characterization (b) includes determining whether the rate of change is either high or low compared to said reference.

22. In a power converter, a method for supplying an output power to a load, comprising the steps of:
    providing a magnetic storage element;
    providing a power input portion comprising a switch;
    providing a power output portion comprising a synchronous rectifier having a switching input, a switching output and a control input for enabling or disabling said synchronous rectifier from conducting current from said switching input to said switching output, and a network wherein said switching input, said switching output and the load are connected together to a circuit;
    providing a bias voltage representative of the output power;
    characterized in that said method further comprises the steps of:
    determining the rate of change of said bias voltage;
    characterizing said rate of change as indicative of a light or a heavy load on the power converter; and
    controlling said control input as a result of said step of characterizing.

23. The method of claim 22, wherein said step of determining includes comparing said bias voltage at a selected time relative to a selected starting value of said bias voltage, and wherein said step of characterizing includes comparing the change in said bias voltage in said step of determining to a reference.

24. The method of claim 23, wherein said step of characterizing includes determining whether the rate of change is either high or low compared to said reference.

25. The power converter of claim 1, wherein the control circuit is responsive to rate of change of the bias voltage to control said control input to:
    open the switching device and prevent conduction of current therethrough to the load in a first, light load mode of operation of the power converter; and close the switching device and cause conduction of current therethrough to the load in a second, normal load mode of operation.

26. The method of claim 13, wherein controlling said control input comprises, in response to the rate of change of the bias voltage comprises:
   opening the switching device and preventing conduction of current therethrough to the load in a first, light load mode of operation of the power converter; and
   closing the switching device and causing conduction of current therethrough to the load in a second, normal load mode of operation.

27. The power converter of claim 16, wherein the control circuit is responsive to rate of change of the bias voltage to control said control input to:
   disable the synchronous rectifier and prevent conduction of current therethrough to the load in a first, light load mode of operation of the power converter; and
   enable the synchronous rectifier and cause conduction of current therethrough to the load in a second, normal load mode of operation.

28. The method of claim 22, wherein controlling said control input comprises, in response to the rate of change of the bias voltage comprises:
   disabling the synchronous rectifier and preventing conduction of current therethrough to the load in a first, light load mode of operation of the power converter; and
   enabling the synchronous rectifier and causing conduction of current therethrough to the load in a second, normal load mode of operation.

29. The power converter according to claim 1, wherein the control circuit enables the switching device when the load is heavy and disables the switching device when the load is light.

30. The power converter according to claim 29, further comprising a diode in said circuit to serve as a secondary switch in a power output portion of the power converter when the switching device is disabled in the light load mode of operation of the power converter.

31. The power converter according to claim 30, wherein the switch device is a semiconductor switching device in parallel with the synchronous rectifier.

32. The power converter according to claim 31, wherein the diode is a discrete component distinct from the semiconductor switching device.

33. The power converter according to claim 31, wherein the diode is a body diode of the semiconductor switching device.

34. The method of claim 13, further comprising enabling the switching device when the load is heavy and disabling the switching device when the load is light.

35. The method according to claim 34, further comprising providing a diode as a secondary switch in the power output portion of the power converter when the switching device is disabled in the light load mode of operation of the power converter.

36. The method according to claim 35, further comprising providing a semiconductor switching device as the switching device of the power output portion of the power converter in parallel with the diode.

37. The method according to claim 36, wherein providing a diode comprises providing a diode that is a discrete component distinct from the semiconductor switching device.

38. The method according to claim 36, wherein providing a diode comprises providing a body diode of the semiconductor switching device.

\* \* \* \* \*